United States Patent [19]
Johnson et al.

[11] Patent Number: 5,585,777
[45] Date of Patent: Dec. 17, 1996

[54] TRANSMITTER WITH ELECTRICAL CIRCUITRY FOR INHIBITING DISCHARGE OF STORED ENERGY

[75] Inventors: Theodore L. Johnson, St. Louis Park; Theodore H. Schnaare, Chaska, both of Minn.

[73] Assignee: Rosemount Inc., Eden Prairie, Minn.

[21] Appl. No.: 255,237

[22] Filed: Jun. 7, 1994

[51] Int. Cl.$^6$ .................................................. H04M 11/04
[52] U.S. Cl. ............................ 340/310.01; 340/310.06; 340/310.03; 340/310.05
[58] Field of Search ................. 340/310.01, 310.06, 340/310.03, 310.04, 310.07, 310.08, 310.02, 310.05

[56] References Cited

U.S. PATENT DOCUMENTS

| | | | |
|---|---|---|---|
| 4,215,394 | 7/1980 | Galloway et al. | 340/310.05 |
| 4,607,247 | 8/1986 | Sterling, Jr. et al. | 340/310.01 |
| 4,691,328 | 9/1987 | Sterling, Jr. et al. | 340/310.07 |
| 4,714,912 | 12/1987 | Roberts et al. | 340/310.02 |
| 4,746,897 | 5/1988 | Shuey | 340/310.03 |
| 4,806,929 | 2/1989 | Nishijima et al. | 340/310.03 |
| 4,885,563 | 12/1989 | Johnson et al. | 340/310.05 |
| 4,903,006 | 2/1990 | Boomgaard | 340/310.03 |
| 4,949,359 | 8/1990 | Voillat | 340/310.05 |
| 4,973,954 | 11/1990 | Schwarz | 340/310.01 |
| 5,187,474 | 2/1993 | Kielb et al. | 340/870.18 |

FOREIGN PATENT DOCUMENTS

| | | |
|---|---|---|
| 2174205 | 10/1986 | United Kingdom. |
| 9308652 | 4/1993 | WIPO ........................ 340/310.07 |

OTHER PUBLICATIONS

"Installation Practices: System Approvals, Entity Parameters, I/S Apparatus (field devices), I/S Associated Apparatus (barriers power supplies, I/O cards . . . ), Simple Apparatus, Wire, Use of Entity Parameters," Frank McGowan, Presentation made at Intrinsic Safety Seminar, Jul. 1993.

"A Design Perspective of I.S. and Fieldbus: Pmax, Imax, Ceq (Cl), Leq (l), Liftoff Voltage, Quiescent Current, Number of Devices, Handheld Terminals," Ted Schnarre, Presentation made at Intrinsic Safety Seminar, Jul. 16, 1993.

"The Significance of EMC to Manufacturers and Users of Industrial Automation Instrumentation", 8130 ATP Automatisierrungstechnische Praxis, 34(1992)Okt., No. 10, Munchen, DE.

*Primary Examiner*—Jeffery Hofsass
*Assistant Examiner*—Nina Tong
*Attorney, Agent, or Firm*—Westman, Champlin & Kelly, P.A.

[57] ABSTRACT

A transmitter coupled to a control loop which carries a loop current senses a process variable which is transmitted over the loop. Circuitry in the transmitter presents an effective capacitance $C_{eff}$ to the control loop. The transmitter includes an isolation network coupled between the circuitry and the control loop which prevents discharge of energy stored in capacitance $C_{eff}$ into the control loop.

10 Claims, 4 Drawing Sheets

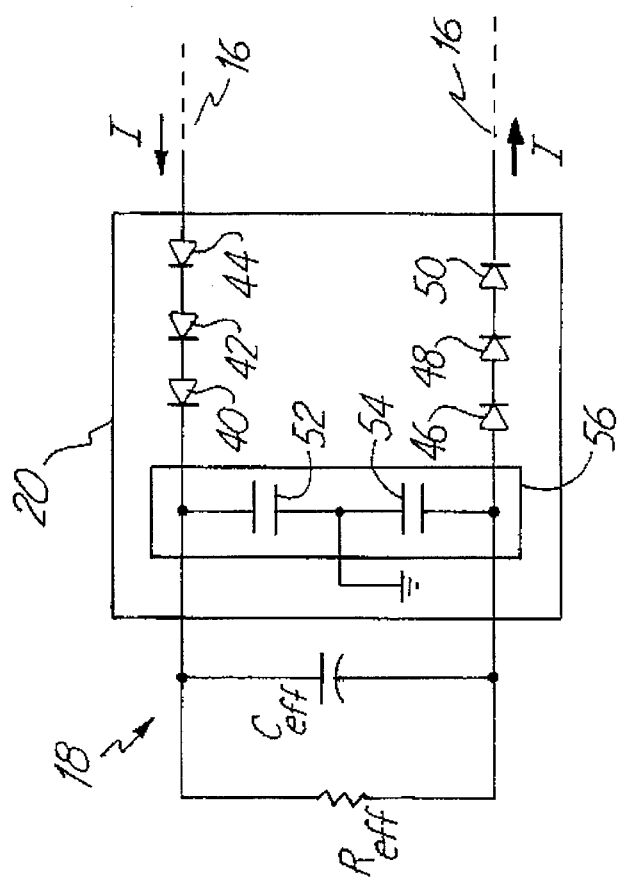
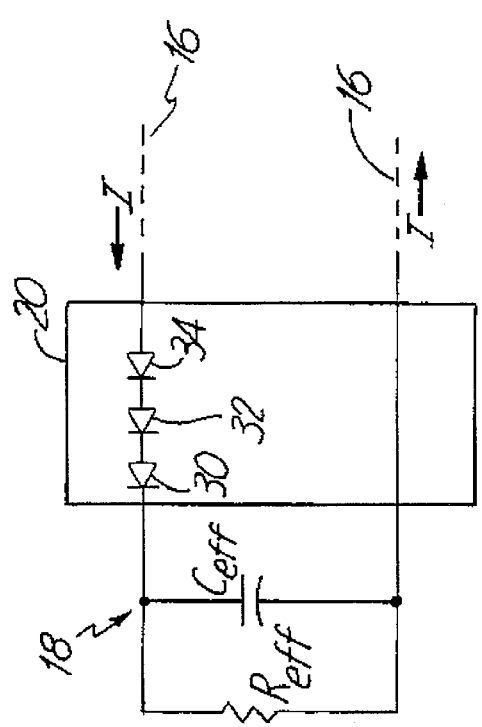
Fig. 3
Fig. 2

TRANSMITTER WITH ELECTRICAL CIRCUITRY FOR INHIBITING DISCHARGE OF STORED ENERGY

BACKGROUND OF THE INVENTION

The present invention relates to transmitters for use in process control loops. More specifically, the present invention relates to isolating transmitter circuitry from the control loop.

Process control systems are used in manufacturing plants to monitor operation of a process. A transmitter is placed in the field and monitors a variable of the process, for example, pressure, temperature or flow. The transmitter couples to a control loop and transmits information over the control loop to a controller which monitors operation of the process. The control loop is a two-wire loop carrying a current which provides power for operation of the transmitter. Communication is through a fieldbus standard which is a digital communications standard in which more than one transmitter can be coupled to a single control loop to transmit the sensed process variable to the control room. This standard is described in ISA 50.02-1992 Section 11. Hart® is another standard which allows digital communication over a 4–20 mA process variable signal.

Circuitry in the transmitter presents an effective capacitance $C_{eff}$ to the control loop. Charge may build up on this capacitance causing the transmitter to store energy across its connections to the loop. This energy may discharge through the loop. In the fieldbus protocol, multiple transmitters are attached to the same loop so that the combined $C_{eff}$ may be particularly large. Attempts have been made to reduce the size of $C_{eff}$ and thereby reduce the amount of potential energy storage capacity of the transmitter. Additionally, $C_{eff}$ varies between transmitters. Thus, the interchange of transmitters is limited.

It would be desirable to isolate the capacitance of the transmitter from the control loop. This would prevent energy discharge into the loop and provide greater interchangeability between transmitters regardless of their internal $C_{eff}$.

SUMMARY OF THE INVENTION

A two-wire transmitter couples to a control loop carrying a loop current. The transmitter senses a process variable and provides an electrical representation thereof to the loop. Circuitry in the transmitter presents an effective capacitance $C_{eff}$ if connected directly to the control loop. The transmitter includes a capacitance isolating network, coupled to the circuitry and to the control loop, which inhibits discharge of energy stored by the effective capacitance $C_{eff}$ into the control loop. In one embodiment, the isolating network comprises at least three diodes connected in series in the direction of current flow of loop current.

BRIEF DESCRIPTION OF THE DRAWINGS

FIG. 2 shows one embodiment of a capacitance isolating network in accordance with the present invention.

FIG. 3 shows one embodiment of a capacitance isolating network in accordance with the present invention.

For convenience, items in the figures having the same reference symbol are the same or serve the same or a similar function.

DETAILED DESCRIPTION OF THE PREFERRED EMBODIMENTS

Figure 1:
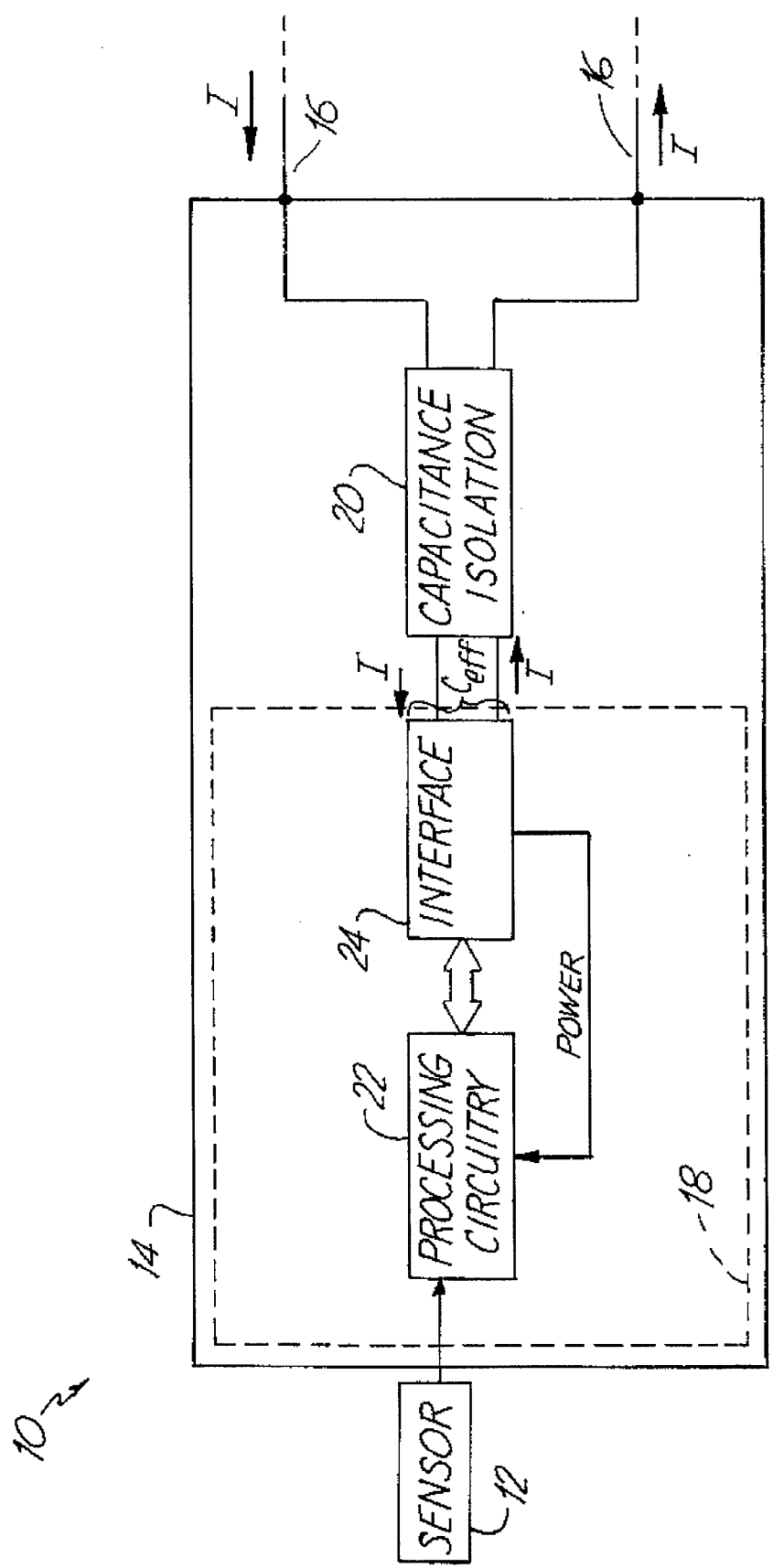
FIG. 1 is a simplified block diagram of a transmitter in accordance with the invention coupled to a control loop.

FIG. 1 is a simplified block diagram of transmitter 10 in accordance with the present invention. Transmitter 10 includes sensor 12 and sensor electronics 14 which couples to control loop 16. Electronics 14 include measurement circuitry 18 and capacitance isolation circuitry 20. Measurement circuitry 18 includes processing circuitry 22 and interface circuitry 24.

Transmitter 10 is powered through electric current I which is received from control loop 16 which causes a voltage drop across transmitter 10. The voltage drop is typically between 9 and 35 volts. In one embodiment, control loop 16 operates under the fieldbus protocol and carries digital information. Sensor 12 senses a process variable which is related to a parameter of the process, such as temperature, pressure, or flow. Processing circuitry 22 processes the process variable. For example, processing circuitry 22 may correct for errors in the sensor or perform other calculations on the process variable. Processing circuitry 22 is coupled to interface circuitry 24 and controls interface circuitry 24 to transmit the process variable over control loop 16. In one embodiment, interface circuitry 24 receives digital instructions over loop 16 which control operation of processing circuitry 22. Further, interface circuitry 24 includes a power supply output which powers processing circuitry 22 and other circuitry in transmitter 10.

Loop current I flows through interface circuity 24. Electronics 14 includes components which have resistance, capacitance and inductance. These components present an effective capacitance $C_{eff}$ to loop 16. FIG. 1 shows the effective capacitance $C_{eff}$ across measurement circuitry 18. $C_{eff}$ is presented to capacitance isolation circuitry 20 in accordance with the invention.

In operation, interface 24 transmits digital information related to an output from sensor 12 through loop 16 in response to a transmit data request, whereby a parameter sensed by sensor 12, or other data, is transmitted over loop 16. In prior art systems, energy stored in capacitance $C_{eff}$ could be discharged through loop 16. In the present invention, capacitance isolation circuitry 20 isolates capacitance $C_{eff}$ from loop 16 to prevent this discharge. However, capacitance isolation circuitry 20 does not interfere with operation of measurement circuitry 18, allowing loop current I to flow and digital information to be exchanged.

FIGS. 2 through 5 show various configurations of capacitance isolation circuitry 20. In FIGS. 2 through 5, the effective capacitance and resistance of measurement circuitry 18 are modeled as capacitor $C_{eff}$ and resistor $R_{eff}$, respectfully. In FIG. 2, isolation circuitry 20 includes diodes 30, 32 and 34. Diodes 30 through 34 are connected in the direction of current flow I and placed in series with loop 16. Diodes 30 through 34 prevent a discharge of energy stored in capacitance $C_{eff}$ through loop 16 by blocking current flow through loop 16 against the flow of current I. The use of three diodes 30 through 34 provides three levels of redundancy. Any two of diodes 30 through 34 may fail and the remaining diode will prevent energy discharge.

FIG. 3 shows another embodiment of isolation circuitry 20. In FIG. 3, isolation circuitry 20 includes diodes 40, 42 and 44 connected in series with loop 16 in the direction of current flow, as current I enters transmitter 10. Circuitry 20 also includes diodes 46, 48 and 50 connected in series in the direction of current flow as current I exits transmitter 10. In FIG. 3, isolation circuitry 20 also includes RF filter capacitors 52 and 54 which capacitively couple the current loop to electrical ground. Typically, capacitors 52 and 54 are set in a center wall 56 of transmitter 10 and have a value of about 2,000 pF. In operation, capacitors 52 and 54 provide an electrical short to ground for high frequency RF signals which interfere with operation of measurement circuitry 18. Isolation circuitry 20 includes two sets of isolation diodes. This prevents discharge of energy in capacitance $C_{eff}$ into loop 16 through a path through electrical ground and capacitor 52 or capacitor 54 in situations where one wire of loop 16 is grounded. Again, three levels of redundance are provided by using two sets of three diodes each (40, 42 and 44 or 46, 48 and 50), one set for either path. Discharge could occur if either capacitor 52 or 54 failed and provided an electrical path to ground which is typically the chassis of the transmitter (not shown in FIG. 3).

Figure 4:
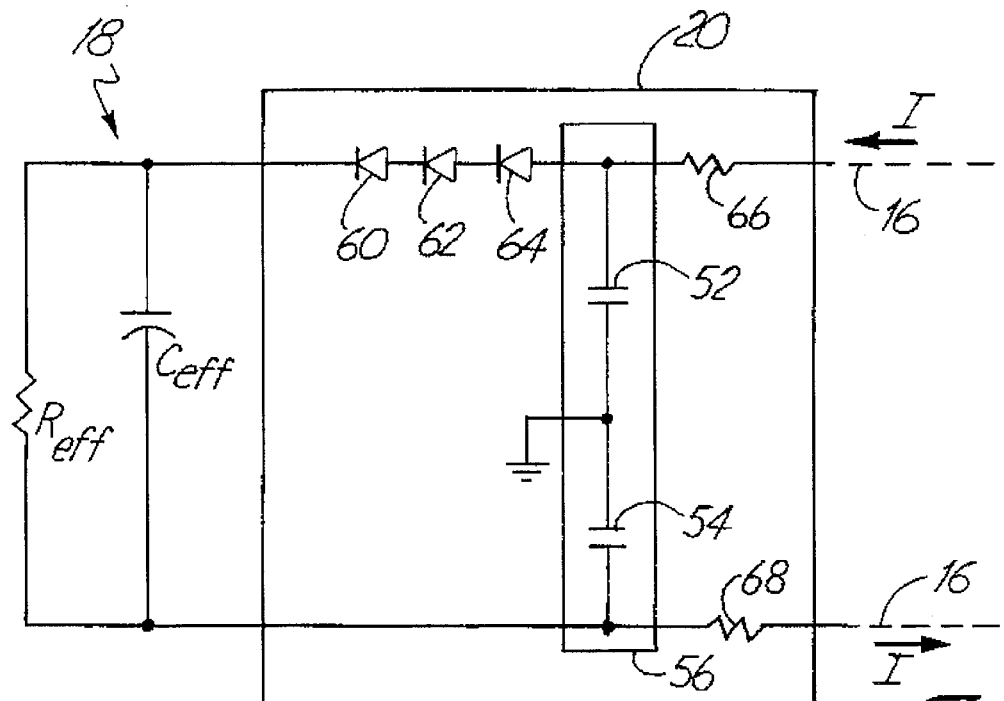
FIG. 4 shows one embodiment of a capacitance isolating network in accordance with the present invention.

FIG. 4 shows another embodiment of capacitive isolation circuit 20 which includes only three diodes 60, 62 and 64 to achieve the desired isolation. Diodes 60, 62 and 64 are connected in series in the direction of loop current flow I along the incoming path of the loop current. Center wall 56 carries RF filter capacitors 52 and 54. Resistors 66 and 68 have been added to the incoming and outgoing paths, respectively, of the loop current I. Typically, the resistance of resistor 66 is the same as the resistance of resistor 68 and has a value of 5.5 Ω. Resistors 66 and 68 are selected to have a value large enough to limit any potential energy storage in capacitors 52 and 54 from being rapidly discharged into loop 16. Further, resistors 66 and 68 and capacitors 52 and 54 should be sufficiently large to reduce failure. In comparison to the circuit of FIG. 3, the circuity of FIG. 4 includes only three diode voltage drops while providing three levels of redundancy.

Figure 5:
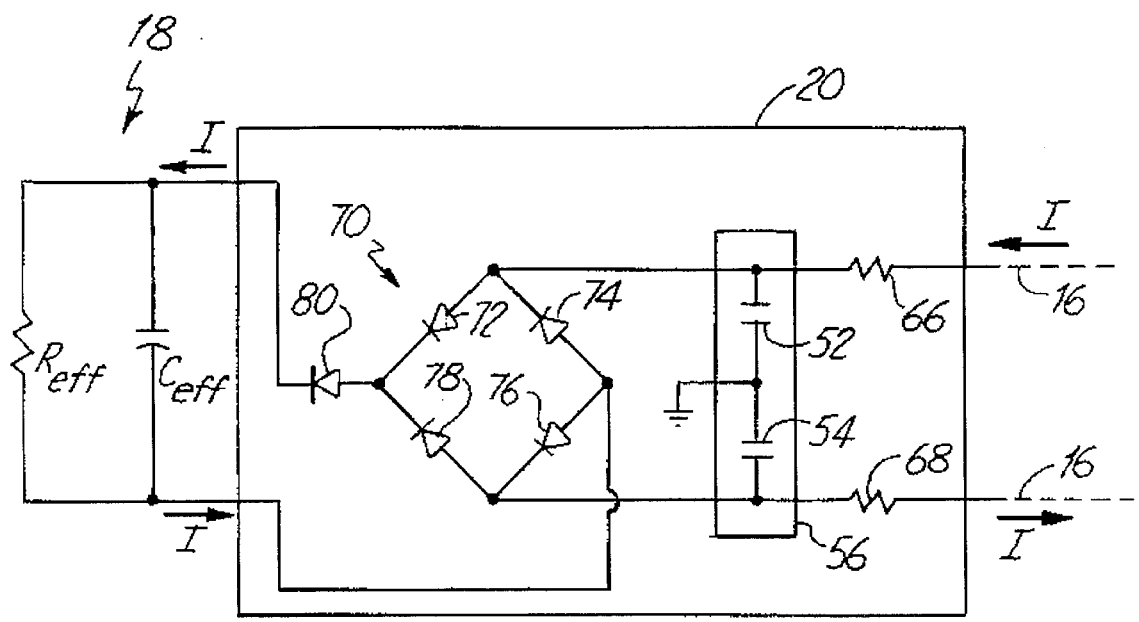
FIG. 5 shows one embodiment of a capacitance isolating network in accordance with the present invention.

FIG. 5 shows another embodiment of circuitry 20. FIG. 5 shows isolation circuitry 20 in which center wall 56 carries capacitors 52 and 54. Circuitry 20 also includes full wave bridge rectifier 70 having diodes 72, 74, 76 and 78. The output of bridge 70 is connected to diode 80. Circuitry 20 of FIG. 5 operates in a manner similar to circuitry 20 of FIG. 4. However, bridge 70 allows the connection between transmitter 10 and control loop 16 to be inverted without affecting operation of transmitter 10. Further, bridge 70 and diode 80 ensure that the path of current I through transmitter 10 always flows through at least three diodes thereby isolating measurement circuitry 18 and providing three levels of redundancy. Using the example of current flow I in the direction indicated in FIG. 5, loop current I passes through diode 72 of bridge 70, diode 80, measurement circuitry 18, and diode 76 of bridge circuity 70. Again, if any two diodes in the current path fail, the remaining third diode prevents the undesired discharge of energy stored in circuity 18 through loop 16.

Figure 6:
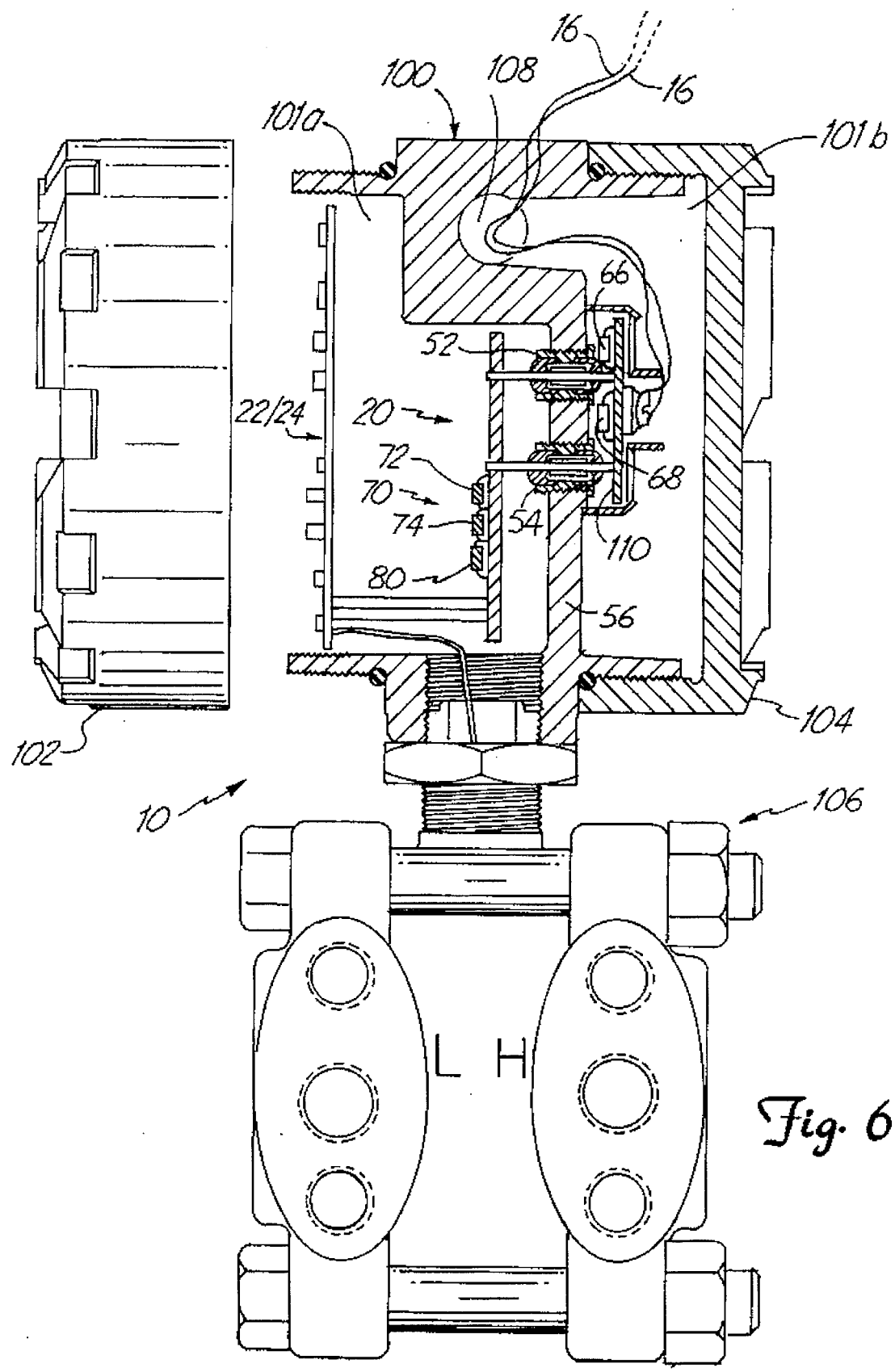
FIG. 6 is a cross-sectional view of the transmitter of FIG. 1.

FIG. 6 is a cross-sectional view of transmitter 10 showing the relative position of circuitry 22 and 24 and center wall 56. FIG. 6 shows transmitter body 100 which is divided into a first chamber 101a and a second chamber 101b by center wall 56. First chamber 101a is sealed by end cap 102 and second chamber 101b is sealed by end cap 104. First chamber 101a carries processing and interface circuitry 22/24. RF filter capacitors 52 and 54 are positioned in center wall 56 and coupled to a circuit board which carries bridge rectifier 70. A circuit board 110 is carried in second chamber 101b and includes terminals which couple to current loop 16 and which enter housing 100 through conduit 108. Circuit board 110 includes resistors 66 and 68. Transmitter housing 100 is attached to sensor housing 106 which carries sensor 12 (not shown in FIG. 6). As shown in FIG. 6, capacitors 52 and 54 allow current I to enter circuitry in first chamber 101a but filter high frequency RF interference. Bridge 70 and diode 80 prevent discharge of energy stored in circuitry 22/24 back into current loop 16, as explained above. The particular transmitter 10 shown in FIG. 6 is for measuring a differential pressure.

The diodes should be selected to provide a low forward voltage drop, for example Schottky barrier diodes. It is desirable to select diodes for bridge rectifier 70 which provide low reverse current leakage to reduce apparent transmitter current. In a preferred embodiment, the diodes of bridge rectifier 70 and diode 80 are Schottky barrier diodes. Diode 80 should be selected to provide linearity through its operating range. Because diode 80 is in only one "leg" of the path of current I, non-linearities may cause signal distortion. In one embodiment, diode 80 has a large current capacity (for example, 30 amps) so that the voltage drop is small at the low current levels of a two-wire transmitter (4–20 mA). However, there is a trade-off between forward voltage drop and leakage current.

Although the present invention has been described with reference to preferred embodiments, workers skilled in the art will recognize that changes may be made in form and detail without departing from the spirit and scope of the invention. For example, the invention can be used in a central controller, field mounted controller, configuration device (such as a hand-held unit), modem or other device which couples to the two-wire current loop. Additionally, isolation elements other than diodes, such as FETs, could be used.

What is claimed is:

1. A transmitter for coupling to a two-wire control loop carrying a loop current, comprising:

a sensor for sensing a variable of a process;

measurement circuitry coupled to the sensor providing a transmitter output related to the process variable, the measurement circuitry powered with the loop current and presenting an effective capacitance $C_{eff}$; and a capacitance isolation network operably coupled between the measurement circuitry and the control loop, the isolation network comprising at least three diodes connected such that the loop current flows through the three diodes simultaneously and inhibits discharge through the control loop of energy stored in $C_{eff}$, the isolation network further comprising an RF filter component connected across the measurement circuitry, wherein the three diodes are coupled between the RF filter component and the effective capacitance $C_{eff}$, and a resistive element connected between the RF filter component and the control loop, having a value selected to limit any potential energy storage from being rapidly discharged from the RF filter capacitor through the control loop.

2. The transmitter of claim 1 wherein the isolation network comprises four diodes connected in a full wave bridge rectifier having input terminals coupled to the control loop and an output terminal coupled to a fifth diode which is connected to the measurement circuitry.

3. The transmitter of claim 1 wherein the RF filter component is placed in a center wall of the transmitter which separates the measurement circuitry from the control loop.

4. A transmitter for use in a process control system, comprising:

a sensor for sensing a process variable;

a transmitter housing having a first chamber and a second chamber divided by a wall operably coupling a measurement circuitry in the first chamber of the housing to a two-wire control loop and the sensor, the measurement circuitry powered by a loop current flowing through the loop and transmitting the process variable over the loop, wherein the measurement circuitry has an energy storage means for storing energy;

energy isolation circuitry in the first chamber of the housing coupled between the measurement circuitry and the control loop including at least three rectifying elements which block energy discharge into the control loop from the measurement circuitry, the three rectifying elements connected wherein one of the elements blocks energy discharge during a failure of any of the two other elements, wherein the energy isolation circuitry also includes an RF filter component electrically coupled between the two-wire control loop and the measurement circuitry the RF filter component including an RF filter capacitor, and wherein the energy isolation circuitry further includes a resistive element connected between the RF filter component and the control loop and having a value selected to limit potential energy stored in the RF filter capacitor from being rapidly discharged through the control loop.

5. The transmitter of claim 4 wherein the rectifying elements comprise diodes.

6. The transmitter of claim 4 wherein the isolation circuitry comprises four rectifying elements connected in a full wave bridge rectifier having input terminals coupled to the control loop and an output terminal coupled to a fifth rectifying element which is connected to the measurement circuitry.

7. The transmitter of claim 4 wherein the RF filter component is coupled to the control loop and the three rectifying elements.

8. The transmitter of claim 4 wherein the RF filter component is placed in the wall of the transmitter.

9. A control loop device for coupling to a two-wire control loop carrying a loop current, comprising:

a connection for coupling to the two-wire control loop;

communication circuitry for communicating information over the two-wire control loop and presenting an effective capacitance $C_{eff}$; and a capacitance isolation network operably coupled between the communication circuitry and the connection to the two-wire control loop, the isolation network comprising at least three diodes such that the loop current flows through the three diodes simultaneously and inhibits discharge of energy stored in $C_{eff}$, the isolation network further comprising an RF filter component coupled across the communication circuitry and the three diodes and being coupled to the control loop through a resistive element, wherein the resistive element limits potential energy stored from being rapidly discharged in a capacitor of the RF filter component through the control loop.

10. The control loop device of claim 9 wherein the isolation network comprises four diodes connected in a full wave bridge rectifier having input terminals coupled to the control loop and an output terminal coupled to a fifth diode which is connected to the communication circuitry.

\* \* \* \* \*

UNITED STATES PATENT AND TRADEMARK OFFICE
CERTIFICATE OF CORRECTION

PATENT NO. : 5,585,777
DATED : December 17, 1996
INVENTOR(S) : Theodore L. Johnson et al.

It is certified that error appears in the above-indentified patent and that said Letters Patent is hereby corrected as shown below:

Col. 5, line 23, after "measurement circuitry", insert --,--.

Signed and Sealed this

First Day of July, 1997

Attest:

Attesting Officer

BRUCE LEHMAN

Commissioner of Patents and Trademarks